United States Patent [19]
Turner

[11] 3,890,001
[45] June 17, 1975

[54] VEHICLE SEATS

[75] Inventor: Harold Roy Turner, Sutton Coldfield, England

[73] Assignee: H. R. Turner (Willenhall) Limited, Walsall, County of Stafford, England

[22] Filed: Jan. 2, 1974

[21] Appl. No.: 430,089

[52] U.S. Cl. ............................................. 297/341
[51] Int. Cl. ............................................ B60n 1/02
[58] Field of Search ............ 297/341, 379, 322, 317

[56] References Cited
UNITED STATES PATENTS

| | | | |
|---|---|---|---|
| 2,803,290 | 8/1957 | Schamel | 297/341 |
| 2,851,083 | 9/1958 | Rhodes | 297/341 |
| 2,856,983 | 10/1958 | Probst | 297/341 |
| 3,814,476 | 6/1974 | Abbott | 297/379 |

FOREIGN PATENTS OR APPLICATIONS 630,300    5/1936    Germany ........................ 297/341

*Primary Examiner*—Francis K. Zugel
*Attorney, Agent, or Firm*—Marshall & Yeasting

[57] ABSTRACT

The invention provides a vehicle seat in which the seat cushion frame is mounted in a fixed seat slide structure to move backwardly and forwardly, the back rest is hinged to the seat cushion to tip, and the back rest is connected to the fixed structure by way of a lever extension and an intermediate plate, the intermediate plate being adjustable to any of a plurality of positions on the fixed structure, to fix the normal position of the seat cushion, and so that tipping of the back rest moves the seat cushion forwardly on the fixed structure.

4 Claims, 4 Drawing Figures

PATENTED JUN 17 1975　　3,890,001

SHEET 1

3,890,001

VEHICLE SEATS

BACKGROUND OF THE INVENTION

This invention relates to vehicle seats of the kind in which the seat cushion frame is mounted to slide forwardly and rearwardly, in a fixed seat slide structure and the seat back is hinged to the said frame and extends beyond the hinge axis to a further pivot on the fixed part which ensures that as the seat back is folded forwardly the seat cushion is slid forwardly in the fixed structure.

Usually the position occupied by the seat cushion when the seat back is in the upright or normal position is adjustable, relative to the fixed structure, by providing a plurality of said further pivots and making the seat back extension releasably engageable with any of these.

This kind of seat is more particularly described for example in U.S. Pat. No. 3,814,476.

It has been found experimentally that the seats of this kind are prone to jam, if for example foreign bodies enter the fixed part and lie in the path of the sliding part, and if force is applied, instead of freeing the jamming by sweeping the foreign body away there is a risk of the parts becoming bent and unserviceable. This point is further explained, according to theories which have been developed by the inventor thereof, with reference to FIG. 1 of the accompanying drawings.

Referring to FIG. 1, the seat back 10 tips in the direction of arrow A about the axis of pin 12 which is carried by the cushion frame 14, and pin 16 carried by the extension 18 of the back rest runs down slot 20 in plate 22 carried by the fixed member 24, thereby urging the frame 14 in the direction of arrow B. This tends to elevate the rear end of the frame 14 and depress the leading end, relative to the fixed part, and although such movement is slight, it is unavoidable because of the geometry and the necessity to provide a clearance for sliding, and increases the possibility of foreign bodies being jammed between the parts 14 and 24. Moreover, because of the length of slot 20, and the necessity of providing a plurality of these (with which pin 16 is releasably engaged, to provide adjustment of the normal fore-and-aft position of the seat) the plate 22 is large. There is a limitation on its thickness and rigidity because of weight factors and hence the plate is the weakest part.

SUMMARY OF THE INVENTION

In accordance with the invention we pivot the back-rest extension to an intermediate plate provided with a single slot, and mount the intermediate plate for adjustment along the fixed member.

This enables a more favourable geometry to be provided, and because the intermediate plate has only a single slot it can be made more robust without weight problems. Moreover, the force applied during tipping can be more evenly distributed reducing the tendency to jam.

DESCRIPTION OF THE PREFERRED EMBODIMENTS

Figure 2:
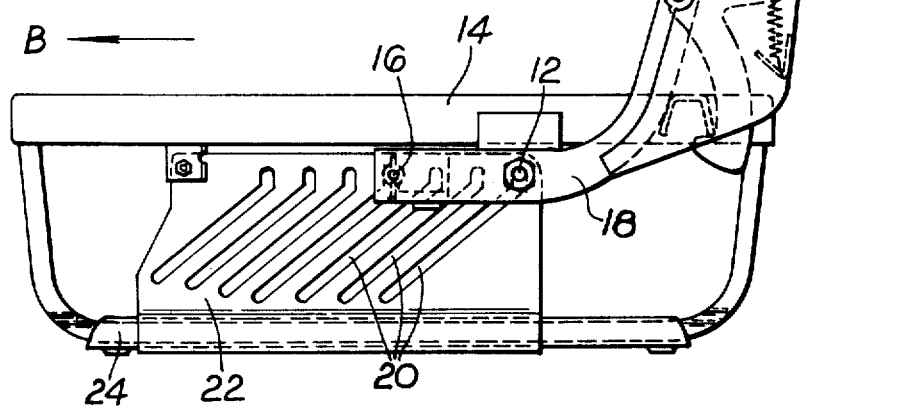
FIG. 2 is an elevation of the arrangement of the invention taken from the same viewpoint as FIG. 1 but with parts omitted for clarity.
Figure 2:
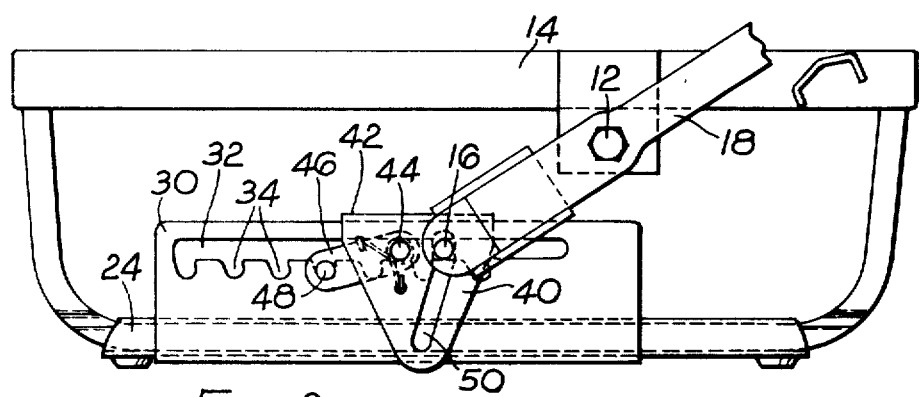

In FIG. 2 plate 30 is fixed to the stationary part 24 and has a single elongated slot 32 with lateral extensions 34. The back rest portion 18 is pivoted on pin 12 on the seat cushion frame and terminates in a pin 16.

Intermediate plate 40 is generally triangular and lies close to plate 30 and has a flange 42 which runs on the edge of the latter to limit movement of the plate 40 in one possible direction of movement. Plate 40 has a pin 44 which runs in the slot 32 to allow movement of the plate 40 along plate 30, and this pin pivots a trigger 46 carrying a pin 48 which is urged by a torsion spring to seat in any one extension 34 and fix the plate 40 in one adjusted position of the seat. Plate 40 has a slot 50 to receive pin 16, and it will be noted that this slot is much more steeply inclined than the equivalent slots 20 in FIG. 1.

Figure 1:
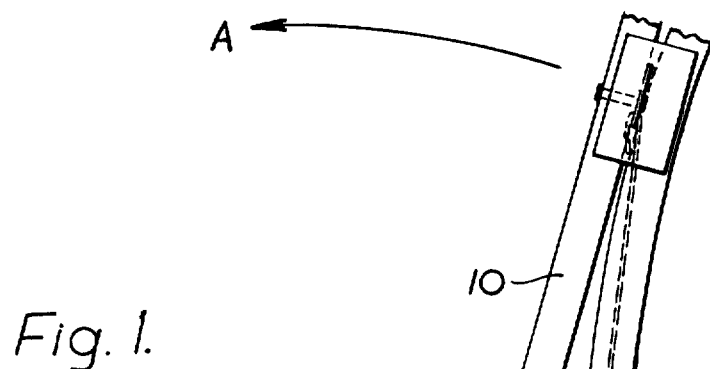
FIG. 1 is a side elevation of a prior art seat structure.

In the tipping action the movement is translated as in FIG. 1, but, due to the angle of slot 50 and the complex interaction of forces from pin 48 and flange 42, the force is much more lengthwise of slot 32 and much less in a direction which causes jamming, and because plate 30 is of reduced dimensions because it does not need to carry the elongated slots, the whole arrangement is more robust and less prone to damage.

Furthermore it is found that with the arrangement illustrated in FIG. 2 the seat back can be folded completely flat on to the seat cushion and in the final part of this movement the pin 16 ceases to travel down slot 50 and reverses and travels up slot 50, from which it can be seen that the reactions to the forces involved are taken by the sides of the slot, and because of its inclination, with little component in downward directions and the effect of this on the jamming tendencies will be plain to the man skilled in the art.

Figure 3:
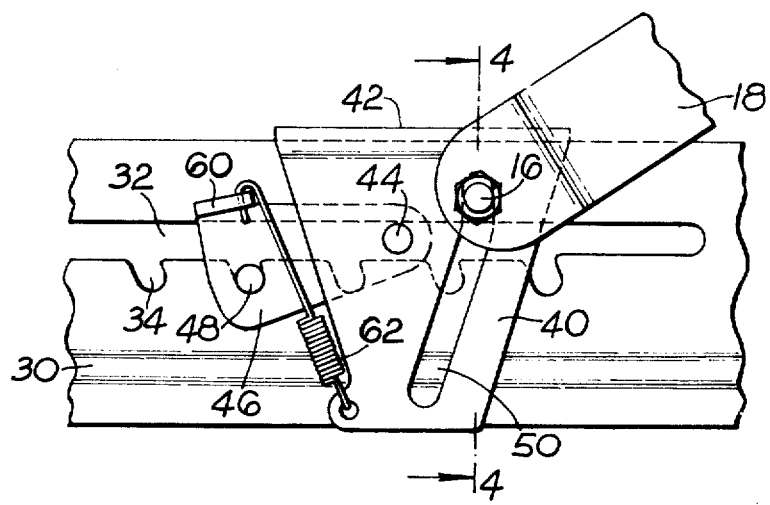
FIG. 3 is an enlarged scale fragmentary view similar to FIG. 2, but showing a modification.
Figure 4:
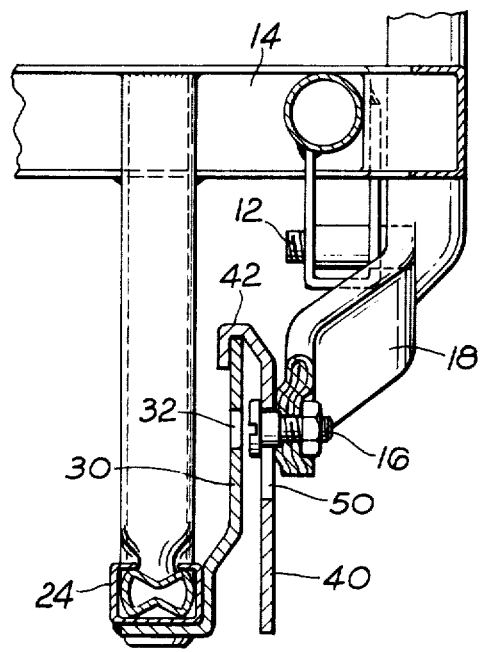
FIG. 4 is a section on the line 4—4 of FIG. 3.

In the arrangement of FIGS. 3 and 4 the trigger is modified to have a flange 60 for finger operation, which is displaced from the axis of pin 48, and the spring loading is simplified in that a tension spring 62 is used as shown instead of (possibly) a torsion spring on pin 44.

Moreover as compared with FIG. 1, the pin 16 is fixed in place and can be a nut and bolt or rivet, instead of the spring-loaded axially movable detent required in FIG. 1. It will be noted that spring 62 does not cause friction of the flange 42 on the fixed part 30, and allows smooth sliding.

I claim:

1. A vehicle seat comprising a seat cushion frame mounted to slide forwardly and rearwardly in a fixed slide structure, a seat back hinged to said frame, which has an extension that projects beyond the hinge axis and carries a pivot that is mounted on said fixed structure, to cause the seat cushion frame to slide forwardly in said fixed structure when the seat back is folded forwardly from its normal position, wherein the improvement comprises an intermediate mounting plate which is provided with a single upwardly extending slot in which said pivot of the seat back extension is slidable and which is slidably mounted on said fixed structure for forward and rearward adjustment to determine the normal fore-and-aft position of the seat relative to the fixed structure.

2. A vehicle seat as claimed in claim 1 wherein said fixed structure comprises a plate having a fore-and-aft extending slot provided with lateral extensions, and said intermediate mounting plate carries a pivoted trigger having a pin which rides in said slot and latches selectively with said lateral extensions.

3. A vehicle seat as claimed in claim 2 wherein the intermediate plate has a flange to run on the edge of the fixed plate.

4. A vehicle seat as claimed in claim 2 wherein the trigger is spring urged to take the pin into one of said lateral extensions.

* * * * *